US010443805B2

(12) United States Patent
Nobe (10) Patent No.: US 10,443,805 B2
(45) Date of Patent: Oct. 15, 2019

(54) VEHICLE LIGHTING FIXTURE

(71) Applicant: Stanley Electric Co., Ltd., Tokyo (JP)

(72) Inventor: Kazuki Nobe, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/792,385

(22) Filed: Oct. 24, 2017

(65) Prior Publication Data

US 2018/0119918 A1 May 3, 2018

(30) Foreign Application Priority Data

Oct. 27, 2016 (JP) ................................ 2016-210776

(51) Int. Cl.
*F21S 43/30* (2018.01)
*F21S 43/19* (2018.01)
*F21S 43/20* (2018.01)
*B60Q 1/26* (2006.01)
*B60Q 1/34* (2006.01)
*B60Q 1/44* (2006.01)
*B60Q 1/00* (2006.01)
(Continued)

(52) U.S. Cl.
CPC .......... *F21S 43/195* (2018.01); *B60Q 1/0058* (2013.01); *B60Q 1/2607* (2013.01); *B60Q 1/34* (2013.01); *B60Q 1/44* (2013.01); *F21S 43/20* (2018.01); *F21S 43/241* (2018.01); *F21S 43/243* (2018.01); *F21S 43/27* (2018.01); *F21S 43/30* (2018.01)

(58) Field of Classification Search
None
See application file for complete search history.

(56) References Cited

U.S. PATENT DOCUMENTS 6,015,219 A * 1/2000 Kelly .................... B60Q 1/007
362/241
6,650,058 B1 * 11/2003 Wang ................. B60Q 1/0052
315/82
(Continued)

FOREIGN PATENT DOCUMENTS

JP H11321447 A 11/1999
WO 2008/023313 A1 2/2008

OTHER PUBLICATIONS

The extended European search report for the related European Patent Application No. 17198046.9 dated Mar. 27, 2018.

*Primary Examiner* — Christle I Marshall
(74) *Attorney, Agent, or Firm* — Kenealy Vaidya LLP (57) ABSTRACT

A vehicle lighting fixture allowing a plurality of lamp units to be attached to a housing with improved operation efficiency is provided. The vehicle lighting fixture includes: a tubular support body having front and rear openings, an inner peripheral surface defining an inner space, and an outer peripheral surface; a first lamp unit supported by the tubular support body in a state where the first lamp unit is arranged in the inner space of the tubular support body, the first lamp unit being configured to emit light from a first light source toward a front side; and a second lamp unit configured to be supported by the tubular support body in a state where the second lamp unit is arranged along the outer peripheral surface of the tubular support body, the second lamp unit being configured to emit light from a second light source to the front side.

18 Claims, 7 Drawing Sheets

(51) Int. Cl.
F21S 43/27 (2018.01)
F21S 43/241 (2018.01)
F21S 43/243 (2018.01)

(56) References Cited

U.S. PATENT DOCUMENTS

| | | | |
|---|---|---|---|
| 8,714,794 B2 * | 5/2014 | Yamazaki | F21S 43/26 |
| | | | 362/521 |
| 2010/0238676 A1 | 9/2010 | Kikuchi | |
| 2013/0114280 A1 | 5/2013 | Oh | |
| 2015/0062945 A1 * | 3/2015 | Chen | B60Q 1/0052 |
| | | | 362/516 |
| 2016/0003444 A1 | 1/2016 | Dennis et al. | |

* cited by examiner

VEHICLE LIGHTING FIXTURE

This application claims the priority benefit under 35 U.S.C. § 119 of Japanese Patent Application No. 2016-210776 filed on Oct. 27, 2016, which is hereby incorporated in its entirety by reference.

TECHNICAL FIELD

The presently disclosed subject matter relates to vehicle lighting fixtures, and in particular, a vehicle lighting fixture configured such that a plurality of lamps (constituent elements) can be effectively attached to a housing (or a main housing), resulting in high operation efficiency.

BACKGROUND ART

Conventional vehicle lighting fixtures have been proposed, which includes a first lamp unit and a second lamp unit. The first lamp unit is configured to include a cylindrical first housing, a first lens defining a first light chamber together with the cylindrical first housing (inner side), and a reflector and a light source for a turn signal lamp that are arranged within the first light chamber. The second lamp unit is configured to include a cylindrical second housing disposed to surround the first housing, a second lens defining a second light chamber together with the cylindrical second housing (inner side), and a reflector and a light source for a rear lamp that are arranged within the second light chamber. (See, for example, FIGS. 2 and 3 of JPH11-321447A (JP1990-321447A).)

However, the vehicle lighting fixture disclosed in JPH11-321447A does not have any unitized constituent elements (the reflector, the light source, etc.) of the respective lamp units. This means that the respective constituent elements must be attached to a main housing independently. Thus, there is a problem that the efficient attachment of the constituent elements to the housing is difficult (meaning that the operation efficiency is reduced).

SUMMARY

The presently disclosed subject matter was devised in view of these and other problems and features in association with the conventional art. According to an aspect of the presently disclosed subject matter, a vehicle lighting fixture can be configured to allow a plurality of lamp units (constituent elements) to be attached to a housing effectively (providing an improved operation efficiency).

According to another aspect of the presently disclosed subject matter, a vehicle lighting fixture can include: a tubular support body having a front opening and a rear opening opposite to the front opening, and an inner peripheral surface defining an inner space and an outer peripheral surface; a first lamp unit configured to be supported by the tubular support body in a state where the first lamp unit is arranged in the inner space surrounded by the inner peripheral surface of the tubular support body, the first lamp unit being configured to emit light from a first light source toward a front side; and a second lamp unit configured to be supported by the tubular support body in a state where the second lamp unit is arranged along the outer peripheral surface of the tubular support body, the second lamp unit being configured to emit light from a second light source to the front side.

According to this aspect, there can be provided a vehicle lighting fixture allowing a plurality of lamp units (constituent elements) to be attached to a housing effectively (providing an improved operation efficiency).

This can be achieved by unitizing the first lamp unit and the second lamp unit by means of the tubular support body as a single unit.

According to this aspect, the provided vehicle lighting fixture can be miniaturized even with the plurality of lamp units.

This can be achieved by the specific arrangement in which the first lamp unit is disposed in the inner space surrounded by the inner peripheral surface of the tubular support body while the second lamp unit is disposed along the outer peripheral surface of the tubular support body.

In a preferred exemplary embodiment of the presently disclosed subject matter described above, the light emitted from the first light source may preferably have a hue different from that of the light emitted from the second light source. In addition, the tubular support body may preferably have a light-shielding property.

According to this exemplary embodiment, the light of the first light source and the light of the second light source from the respective lamp units can be prevented from being mixed with each other, so that the separate colored light beams can be projected. This means that the intrinsic functions of the respective lamp units can be prevented from being impaired.

This can be achieved by optically shielding the first lamp unit (including the first light source) and the second lamp unit (including the second light source) from each other by the light-shielding tubular support body.

In a preferred exemplary embodiment of the presently disclosed subject matter as described above, the first lamp unit can include a reflector configured to reflect the light from the first light source to direct the light toward the front side, and a lens disposed in front of the reflector and configured to allow the light reflected from the reflector to pass therethrough.

In another preferred exemplary embodiment of the presently disclosed subject matter as described above, the second lamp unit can include the second light source, a light guiding member configured to guide the light from the second light source, a sub-bracket configured to hold the second light source, and a tubular lens body having an incident surface, on which the light from the second light source having been guided by the light guiding member is incident, and a light emission surface through which the light having entered the lens body exits. In this configuration, the tubular lens body can be supported by the tubular support body such that an inner peripheral surface of the tubular lens body faces to the outer peripheral surface of the tubular support body.

In a further preferred exemplary embodiment of the presently disclosed subject matter, the vehicle lighting fixture can include a housing and an outer lens configured to form a lighting chamber together with the housing. The tubular support body, the first lamp unit, and the second lamp unit can be disposed in the lighting chamber. The tubular support body can include a wall part that can cover a part of the rear opening. The wall part can have a first through hole into which a part of the first lamp unit can be inserted. The second lamp unit can have a second through hole into which the part of the first lamp unit having been inserted into the first through hole can be inserted. The housing can have a third through hole into which a fixing screw can be inserted. The fixing screw having been inserted into the third through hole of the housing can be screwed to the part of the first lamp unit having been inserted into the first through hole of the wall part of the tubular support body and also into the second through hole of the second lamp unit, so that the tubular support body, the first lamp unit, and the second lamp unit can be fixed to the housing.

According to this exemplary embodiment, only by screwing the fixing screw having been inserted into the third through hole into the part of the first lamp unit having been inserted into the first and second through holes, the plurality of lamp units (constituent elements) can be attached to the housing with ease.

In a preferred exemplary embodiment of the presently disclosed subject matter as described above, the first light source can be mounted to the housing.

In another preferred exemplary embodiment of the presently disclosed subject matter described above, the tubular support body can be a cylindrical support body.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting fixtures of the presently disclosed subject matter with reference to the accompanying drawings in accordance with exemplary embodiments. In the drawings, the same or similar components are denoted by the same reference numeral and a redundant description will be appropriately omitted.

It should be noted that the directions are basically defined assuming the vehicle lighting fixture is mounted in a vehicle body and the "front direction" used herein is defined to be a light emitting direction in which light is mainly emitted from the vehicle lighting fixture.

Figure 1:
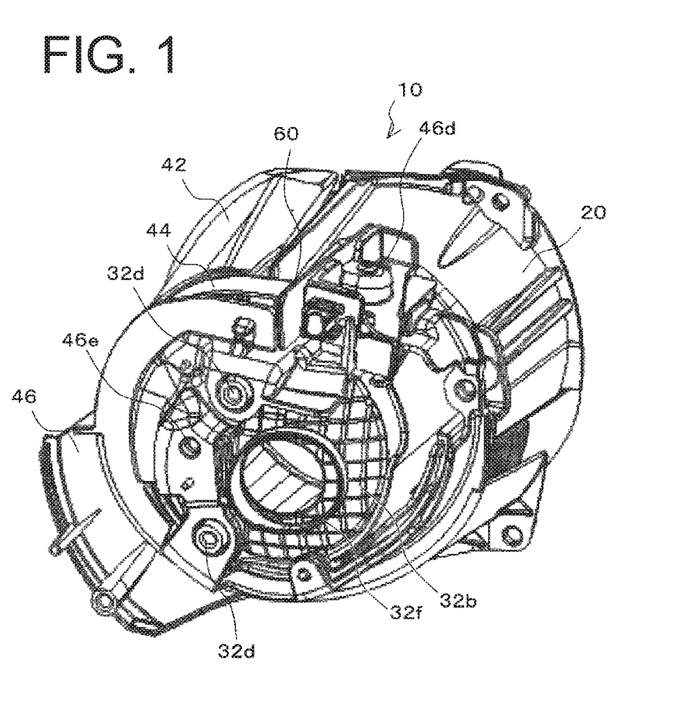
FIG. 1 is a perspective view illustrating a vehicle lighting fixture 10 made in accordance with principles of the presently disclosed subject matter, when viewed from its rear side.

FIG. 1 is a perspective view illustrating a vehicle lighting fixture 10 made in accordance with the principles of the presently disclosed subject matter, when viewed from its rear side.

The vehicle lighting fixture 10 illustrated in FIG. 1 can be a marker lamp (or a signal lamp) that can serve as a rear lamp and a turn signal lamp and to be mounted on a vehicle body at rear left and right areas thereof.

Figure 2A:
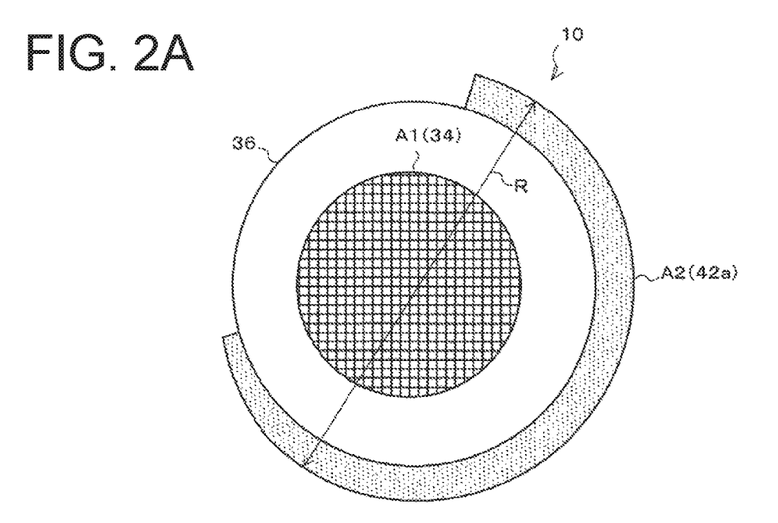
FIG. 2A is a front view of the vehicle lighting fixture 10.
Figure 2B:
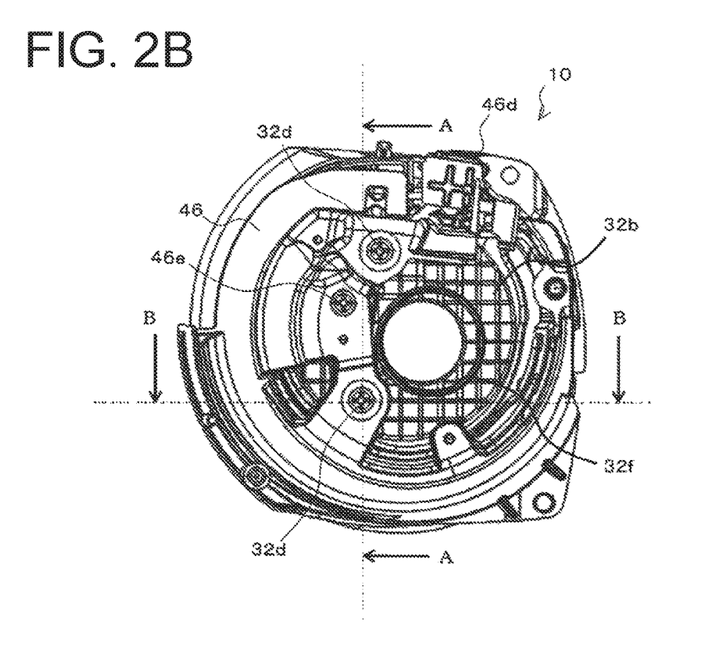
FIG. 2B is a rear view of the vehicle lighting fixture 10.

FIG. 2A is a front view of the vehicle lighting fixture 10, and FIG. 2B is a rear view of the vehicle lighting fixture 10.

Figure 3A:
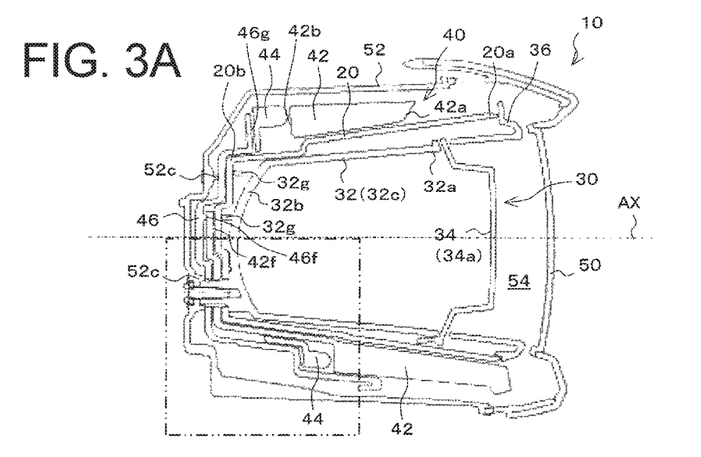
FIG. 3A is a cross-sectional view of the vehicle lighting fixture 10 taken along line A-A in FIG. 2B.
Figure 3B:
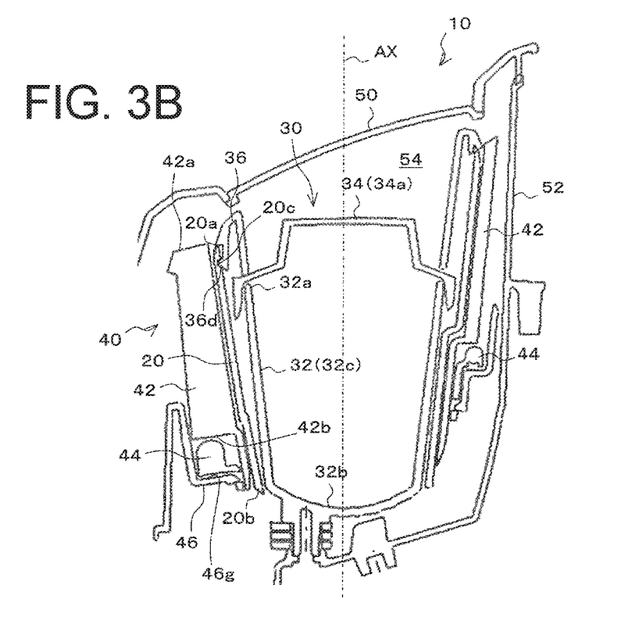
FIG. 3B is a cross-sectional view of the vehicle lighting fixture 10 taken along line B-B in FIG. 2B.
Figure 4:
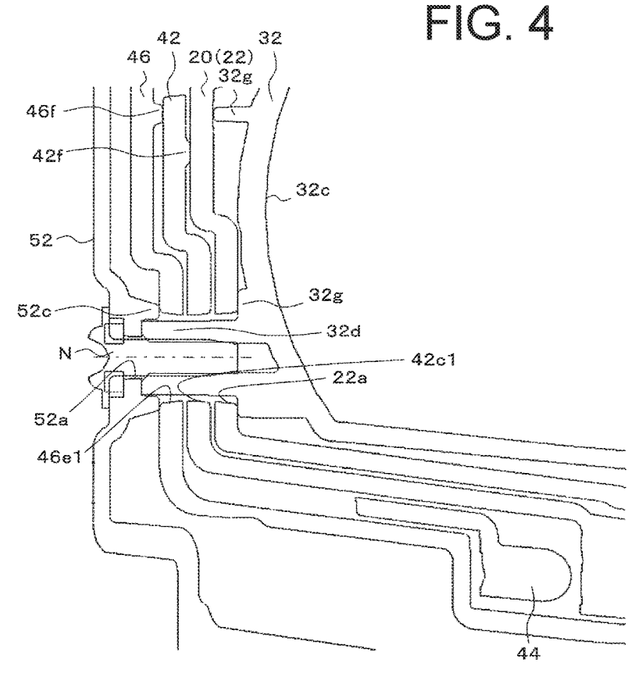
FIG. 4 is a partial enlarged view of the vehicle lighting fixture 10 in FIG. 3A.
Figure 5:
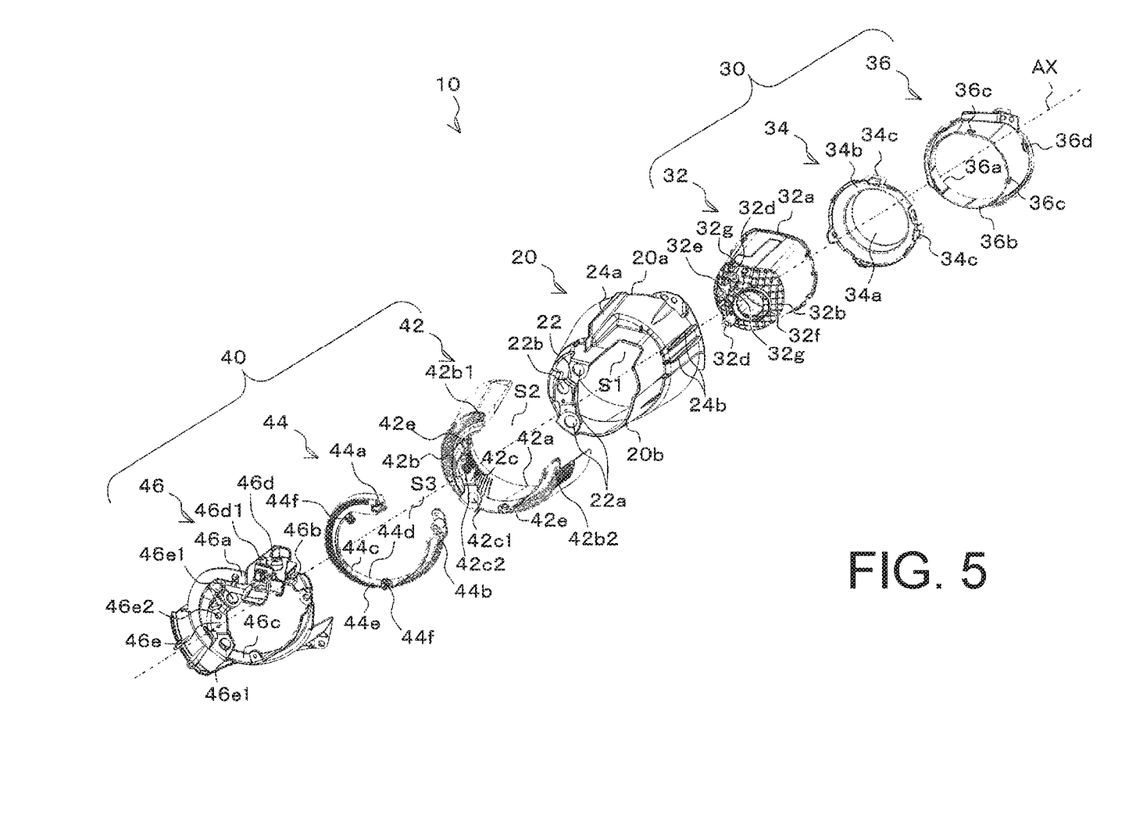
FIG. 5 is an exploded perspective view of the vehicle lighting fixture 10 when viewed from its rear side.

FIG. 3A is a cross-sectional view of the vehicle lighting fixture 10 taken along line A-A in FIG. 2B, and FIG. 3B is a cross-sectional view of the vehicle lighting fixture 10 taken along line B-B in FIG. 2B. FIG. 4 is a partial enlarged view of the vehicle lighting fixture 10 in FIG. 3A. FIG. 5 is an exploded perspective view of the vehicle lighting fixture 10 when viewed from its rear side.

As illustrated in FIGS. 1 to 5, the vehicle lighting fixture 10 of the presently disclosed subject matter can include a tubular bracket 20, a first lamp unit 30, and a second lamp unit 40, etc. Further, an outer lens 50 and a housing 52 can be included to define a lighting chamber 54. As illustrated in FIG. 3, the aforementioned components of the vehicle lighting fixture 10 can be disposed within the lighting chamber 54 and fixed to the housing 52.

The tubular bracket 20 can be a cylindrical bracket (cylindrical support body) having a front opening 20a and a rear opening 20b opposite to the front opening 20a. The tubular bracket 20 corresponds to the tubular support body of the presently disclosed subject matter.

The tubular bracket 20 can be configured to be tapered from the front opening 20a to the rear opening 20b in a conical shape (see FIGS. 3A and 3B).

The tubular bracket 20 can be provided with a wall part 22 (transverse attachment part) that can cover part of the rear opening 20b. The wall part 22 can be configured to be across the rear opening 20b at the substantial center thereof.

The wall part 22 can have through holes 22a for fixing a housing and a through hole 22b for temporary assembly. The first lamp unit 30 can have a turn signal lamp reflector 32, a part of which can serve as screw receiving portions 32d for fixing a housing. The screw receiving portions 32d of the first lamp unit 30 can be inserted into the through holes 22a for fixing a housing. Furthermore, the turn signal lamp reflector 32 of the first lamp unit 30 can have a part which can serve as a screw receiving portion 32e for temporary assembly. The screw receiving portion 32e for temporary assembly of the first lamp unit 30 can be inserted into the through hole 22b for temporary assembly. Herein, the through hole 22a for fixing a housing corresponds to the first through hole of the presently disclosed subject matter.

The tubular bracket 20 can have an inner peripheral surface where an engagement portion 20c (for example, a recess illustrated in FIG. 3B) can be provided in order to fix an extension 36 to the tubular bracket 20. Specifically, a claw portion 36d provided to the extension 36 can be engaged with the engagement portion 20c. The engagement portion 20c is not limited to a single portion, but may be provided to a plurality of locations in a circumferential direction of the tubular bracket 20.

The tubular bracket 20 can have an outer peripheral surface where ribs 24a and 24b extending in an axial line AX direction of the tubular bracket 20 can be provided. The outer peripheral surface of the tubular bracket 20 can be subjected to an aluminum deposition treatment. The outer peripheral surface having the aluminum deposition can be observed through a sleeve lens 42, which can be included in the second lamp unit 40 and will be described later.

A cutout portion S1 can be formed in the rear surface of the tubular bracket 20 to dispose a light source module 60 and a light source module holding portion 46d, which will be described later.

The tubular bracket 20 can have a light-shielding property. Specifically, the light-shielding tubular bracket 20 can optically isolate the first lamp unit 30 (including a light source 70 for a turn signal lamp (see FIG. 8)) and the second lamp unit 40 (including a light source 62 for a rear lamp). As a result, the light (amber light) of the light source 70 for a turn signal lamp and the light (red light) of the light source 62 for a rear lamp from the respective lamp units 30 and 40 can be prevented from being mixed with each other, so that the separate colored light beams can be properly projected. This means that the intrinsic functions of the respective first and second lamp units 30 and 40 can be prevented from being impaired.

The tubular bracket 20 having the aforementioned configuration can be formed by, for example, injection molding a synthetic resin having a light-shielding property in a metal mold.

The first lamp unit 30 can serve as a lamp unit for a turn signal lamp. The first lamp unit 30 can be supported (fixed) by the tubular bracket 20 while the first lamp unit 30 can be disposed in the inner space surrounded by the inner peripheral surface of the tubular bracket 20 (see FIGS. 3A and 3B). As illustrated in FIG. 2A, the first lamp unit 30 can include a light emission region A1 having a circular shape when viewed from its front side. The light emission region A1 can be constituted by a turn signal lamp lens 34.

As illustrated in FIG. 5, the first lamp unit 30 can include a turn signal lamp reflector 32, the turn signal lamp lens 34, and an extension 36.

The turn signal lamp reflector 32 can be a cup-shaped reflector having an opened front side (front opening 32a) and a closed rear wall 32b.

The turn signal lamp reflector 32 can be configured to tapered from the front opening 32a to the rear wall 32b in a conical shape (see FIGS. 3A and 3B).

The turn signal lamp reflector 32 can include a reflecting surface 32c formed from aluminum deposition (see FIGS. 3A and 3B) on the inner side. The reflecting surface 32c can be configured to reflect light from the light source 70 for a turn signal lamp toward the turn signal lamp lens 34 that can cover the front opening 32a.

The rear wall 32b of the turn signal lamp reflector 32 can be provided with the screw receiving portions 32d for fixing a housing (in the illustrated example, two screw receiving portions) and the screw receiving portion 32e for temporary assembly. Furthermore, a through hole 32f can be formed in the rear wall 32b of the turn signal lamp reflector 32. The housing 52 can have an attachment hole 52b (see FIG. 8), to which the light source 70 for a turn signal lamp can be attached. When assembled, the attached light source 70 can be inserted into the through hole 32f of the rear wall 32b of the turn signal lamp reflector 32. Here, examples of the light source 70 for a turn signal lamp may include a bulb light source emitting amber light, such as an incandescent bulb emitting amber light.

The turn signal lamp reflector 32 configured as described above can be disposed in the inner space surrounded by the inner peripheral surface of the tubular bracket 20 (see FIGS. 3A and 3B).

Specifically, the turn signal lamp reflector 32 can be disposed in the inner space surrounded by the inner peripheral surface of the tubular bracket 20 while the screw receiving portions 32d for fixing a housing and the screw receiving portion 32e for temporary assembly of the turn signal lamp reflector 32 are inserted into the through holes 22a for fixing a housing and the through hole 22b for temporary assembly of the tubular bracket 20, respectively.

In this exemplary embodiment, the outer peripheral surface of the turn signal lamp reflector 32 can be formed in a substantially similar shape to the inner peripheral surface of the tubular bracket 20. Thus, when they are assembled, any unnecessary gap can be prevented from being formed between the turn signal lamp reflector 32 and the tubular bracket 20. Furthermore, the turn signal reflector 32 can be provided with ribs 32g so as to be in contact with the tubular bracket 20 (see FIG. 3A). Consequently, this structure can reduce the gap between the turn signal lamp reflector 32 and the tubular bracket 20.

The above-described turn signal lamp reflector 32 can be molded by injection molding a synthetic resin, such as an acrylic resin or a polycarbonate resin, using a metal mold.

The turn signal lamp lens 34 can include a lens portion 34a having an outer circular shape, and a lens frame portion 34b configured to hold the lens portion 34b while surrounding the lens portion 34a. This turn signal lamp lens 34 corresponds to the lens of the presently disclosed subject matter.

The lens frame portion 34b can be provided with an engagement portion 34c (for example, an opening) in order to fix the turn signal lamp lens 34 to the extension 36. Specifically, a claw portion 36c provided to the extension 36 can be engaged with the engagement portion 34c. The engagement portion 34c is not limited to a single portion, but may be provided to a plurality of locations in a circumferential direction of the lens frame portion 34b.

The turn signal lamp lens 34 configured as described above can be fixed to the extension 36 by engaging the plurality of claw portions 36c provided to the extension 36 to the plurality of engagement portions 34c provided to the lens frame portion 34b. Then, the extension 36 can cover the peripheral edge and the like of the turn signal lamp lens 34 such that the peripheral edge and the like of the turn signal lamp lens 34 can be prevented from being visually observed (see FIGS. FIGS. 3A and 3B).

The above-described turn signal lamp lens 34 can be molded by injection molding a transparent resin, such as an acrylic resin or a polycarbonate resin, using a metal mold. In some cases, such a turn signal lamp lens 34 may be omitted according to the intended use purposes.

The extension 36 can be formed in a cylindrical shape having a front opening 36a and a rear opening 36b opposite to the front opening 36a.

As already described above, the extension 36 can be provided with the claw portions 36c to be engaged with the engagement portions 34c of the turn signal lamp lens 34. The claw portions 36c can be provided at a plurality of locations in the circumferential direction of the extension 36.

The extension 36 can be provided with the claw portions 36d in order to fix the extension 36 to the tubular bracket 20. Specifically, the claw portions 36d provided to the extension 36 can be engaged with the engagement portions 20c (for example, a recess as in FIG. 3B) provided to the inner peripheral surface of the tubular bracket 20. As described above, similarly to the engagement portions 20c, the claw portion 36d is not limited to a single portion, but may be provided to a plurality of locations in the circumferential direction of the extension 36.

The thus configured extension 36 together with the turn signal lamp lens 34 fixed thereto can be disposed in the inner space surrounded by the inner peripheral surface of the tubular bracket 20 (see FIGS. 3A and 3B).

Specifically, when the plurality of claw portions 36d provided to the extension 36 are engaged with the plurality of engagement portions 20c provided to the inner peripheral surface of the tubular bracket 20, the extension 36 together with the turn signal lamp lens 34 fixed thereto can be disposed in the inner space surrounded by the inner peripheral surface of the tubular bracket 20. In this manner, the turn signal lamp lens 34 can be disposed while the lens 34 can cover the front opening 32a of the turn signal lamp reflector 32.

The above-described extension 36 can be molded by injection molding a synthetic resin, such as an acrylic resin or a polycarbonate resin, using a metal mold.

In the first lamp unit 30 configured as described above, the light from the light source 70 for a turn signal lamp can be reflected by the reflecting surface 32c of the turn signal lamp reflector 32 and then projected forward through the turn signal lamp lens 34.

The second lamp unit 40 can serve as a lamp unit for a rear lamp. The second lamp unit 40 can be supported (fixed) by the tubular bracket 20 while the second lamp unit 40 can be disposed along the outer peripheral surface of the tubular bracket 20 (see FIGS. 3A and 3B). As illustrated in FIG. 2A, the second lamp unit 40 can include a light emission region A2 having a circular arc shape when viewed from its front side. The light emission region A2 can be constituted by a front opening end face 42a of the sleeve lens 42.

As illustrated in FIG. 5, the second lamp unit 40 can include the sleeve lens 42, a light guiding body 44, and a sub-bracket 46.

The sleeve lens 42 can be a cylindrical lens body having the front opening end surface 42a and a rear opening end surface 42b opposite to the front opening end surface 42a. The sleeve lens 42 formed from the cylindrical lens boy can receive light, which has exited through the light guiding body 44 (light emission surface 44d), through the rear opening end surface 42b and allow the light to exit through the front opening end surface 42a. Here, the rear opening end surface 42b corresponds to the incident surface of the presently disclosed subject matter, the front opening end surface 42a corresponds to the light emission surface of the presently disclosed subject matter, and the sleeve lens 42 corresponds to the tubular lens body of the presently disclosed subject matter. The diameter R of the front opening end surface 42a of the sleeve lens 42 is, for example, approximately 130 mm (see FIG. 2A).

The sleeve lens 42 can be configured to be tapered from the front opening end surface 42a to the rear opening end surface 42b in a conical shape (see FIGS. 3A and 3B).

It should be noted that the sleeve lens 42 is not a perfect cylinder, but can include a cutout portion S2 formed over the distance between the front opening end surface 42a and the rear opening end surface 42b and at a position corresponding to the cutout portion S1 of the tubular bracket 20. Thus, the front opening end surface 42a and the rear opening end surface 42b can be formed to have a circular arc shape separated by the cutout portion S2.

The rear opening end surface 42b can be a curved surface. Specifically, the rear opening end surface 42b can include one end 42b1 and the other end 42b2 that are located at different locations in relation to the axial line AX direction of the tubular bracket 20, in particular, at a location closer to the rear side and at a location closer to the front side, respectively.

The sleeve lens 42 can be provided with a wall part 42c that can cover part of the rear opening end surface 42b.

Specifically, the wall part 42c can include a through hole 42c1 for fixing a housing and a through hole 42c2 for temporary assembly formed therein. The screw receiving portion 32d for fixing a housing that is part of the turn signal reflector 32 of the first lamp unit 30 can be inserted into the through hole 42c1 for fixing a housing. The screw receiving portion 32e for temporary assembly that is part of the turn signal reflector 32 of the first lamp unit 30 can be inserted into the through hole 42c2 for temporary assembly. The through hole 42c1 for fixing a housing corresponds to the second through hole of the presently disclosed subject matter.

The sleeve lens 42 configured as described above can be disposed along the outer peripheral surface of the tubular bracket 20.

Specifically, when the screw receiving portion 32d for fixing a housing and the screw receiving portion 32e for temporary assembly of the turn signal lamp reflector 32 are inserted into the through hole 42c1 for fixing a housing and the through hole 42c2 for temporary assembly of the sleeve lens 42, respectively, the sleeve lens 42 can be disposed in such a state that the inner peripheral surface of the sleeve lens 42 faces to the outer peripheral surface of the tubular bracket 20.

In this exemplary embodiment, the inner peripheral surface of the sleeve lens 42 can be formed in a substantially similar shape to the outer peripheral surface of the tubular bracket 20. Thus, when they are assembled, any unnecessary gap can be prevented from being formed between the sleeve lens 42 and the tubular bracket 20. Furthermore, the sleeve lens 42 can be provided with ribs 42f so as to be in contact with the tubular bracket 20 (see FIG. 3A). Consequently, this structure can reduce the gap between the sleeve lens 42 and the tubular bracket 20.

In the sleeve lens 42 configured as described above, the light from the light guiding body 44 (light emission surface 44d thereof) can enter the sleeve lens 42 through the rear opening end surface 42b and then be projected uniformly (or substantially uniformly) forward through the entire (or substantially entire) front opening end surface 42a.

The above-described sleeve lens 42 can be molded by injection molding a transparent resin, such as an acrylic resin or a polycarbonate resin, using a metal mold.

The light guiding body 44 can be a circular arc-shaped light guiding member including a base end portion 44a, a tip end portion 44b, and a curved portion 44c connecting the base end portion 44a and the tip end portion 44b.

The curved portion 44c of the light guiding body 44 can be kinked so that the base end portion 44a and the tip end portion 44b are located at different locations in relation to the axial line AX direction of the tubular bracket 20 (see FIG. 6), in particular, at a location closer to the rear side and at a location closer to the front side, respectively.

The curved portion 44c of the light guide body 44 can have a front-side surface that can serve as the light emission surface 44d through which the light emitted from the light source module 60 and guided by the curved portion 44c of the light guide body 44 can exit.

The curved portion 44c of the light guide body 44 can have a rear-side surface that can serve as a diffusion surface 44e. The diffusion surface 44e can be configured to diffuse the light emitted from the light source module 60 and guided through the curved portion 44c in order for the light to exit through the light emission surface 44d uniformly (or substantially uniformly) and entirely (or substantially entirely).

The light guide body 44 can include a cutout portion S3 formed over the distance between the base end portion 44a and the tip end portion 44b and at a position corresponding to the cutout portion S1 of the tubular bracket 20 (also to the cutout portion S2 of the sleeve lens 42). Thus, the light emission surface 44d and the diffusion surface 44e can be formed to have a circular arc shape separated by the cutout portion S3.

Like the rear opening end surface 42b of the sleeve lens 42, the light emission surface 44d and the diffusion surface 44e can be a curved surface in such a manner that the base end portion 44a and the tip end portion 44b are located at different locations in relation to the axial line AX direction of the tubular bracket 20.

The sleeve lens 42 can have a positioning pin 42e, and the curved portion 44c of the light guide body 44 can have a through hole 44f through which the positioning pin 42e of the sleeve lens 42 can be inserted.

The width of the light guide body 44, i.e., the width of the light emission surface 44d can be formed to be narrower as it is closer to the tip end portion 44b.

The light guide body 44 configured as described above can be disposed along the outer peripheral surface of the tubular bracket 20.

Specifically, when the positioning pin 42e of the sleeve lens 42 is inserted into the through hole 44f formed in the light guide body 44, the light guide body 44 can be disposed along the outer peripheral surface of the tubular bracket 20 such that the light emission surface 44d of the light guide body 44 faces to (or is in close contact with) the rear opening end face 42b of the sleeve lens 42.

In the light guide body 44 configured as described above, the light emitted from the light source module 60, i.e., from the light source 62 for a rear lamp, can be incident on the base end portion 44a and guided through the curved portion 44c. During the guiding of the light, the light can be internally reflected by the diffusion surface 44e to uniformly (or substantially uniformly) exit through the entire (or substantially entire) light emission surface 44d, and then can enter the sleeve lens 42 through the rear opening end surface 42b thereof.

The above-described light guide body 44 can be molded by injection molding a transparent resin, such as an acrylic resin or a polycarbonate resin, using a metal mold.

The sub-bracket 46 can be a circular arc-shaped member including a base end portion 46a, a tip end portion 46b, a curved portion 46c connecting the base end portion 46a and the tip end portion 46b, and the light source module holding portion 46d.

The curved portion 46c of the sub-bracket 46 can be kinked so that the base end portion 46a and the tip end portion 46b are located at different locations in relation to the axial line AX direction of the tubular bracket 20, in particular, at a location closer to the rear side and at a location closer to the front side, respectively.

The curved portion 46c of the sub-bracket 46 can have a front-side surface 46g (see FIGS. 3A and 3B) that can face to (or be in close contact with) the diffusion surface 44e of the light guide body 44. The surface 46g can be subjected to an aluminum deposition treatment so that any leakage light from the diffusion surface 44e of the light guide body 44 can be reflected to be directed to and re-enter the light guide body 44.

The base end portion 46a and the tip end portion 46b of the sub-bracket 46 can be connected to the rear side and the front side of the light source module holding portion 46d, respectively.

The light source module holding portion 46d can include a light source module attachment surface 46d1, which can be substantially parallel to a plane including the axial line AX of the tubular bracket 20.

The sub-bracket 46 can further include a wall portion 46e that can connect the base end portion 46a side of the curved portion 46c to the substantial center of the curved portion 46c.

The wall portion 46e can have a through hole 46e1 for fixing a housing and a through hole 46e2 for temporary assembly formed therein. The screw receiving portions 32d of the first lamp unit 30 (a part of the turn signal lamp reflector 32) can be inserted into the through holes 46e1 for fixing a housing. Herein, the through hole 46e1 for fixing a housing corresponds to the second through hole of the presently disclosed subject matter.

Figure 7:
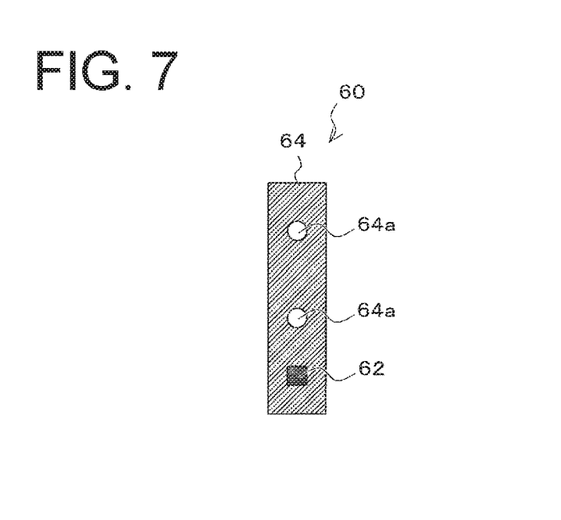
FIG. 7 is a plan view illustrating one example of a light source module 60 for use in the vehicle lighting fixture 10.

As illustrated in FIG. 7, the light source module 60 can include the light source 62 for a rear lamp and a substrate 64 on which the light source 62 can be mounted. The light source 62 for a rear lamp can be a semiconductor light-emitting element, such as an LED, configured to emit red light. The light source 62 for a rear lamp corresponds to the second light source of the presently disclosed subject matter. The substrate 64 can have a through hole 64a. The light source module holding portion 46d can have a pin 46d2 provided to the light source module attachment surface 46d1. The pin 46d2 of the light source module holding portion 46d can be inserted into the through hole 64a of the substrate 64.

Figure 6:
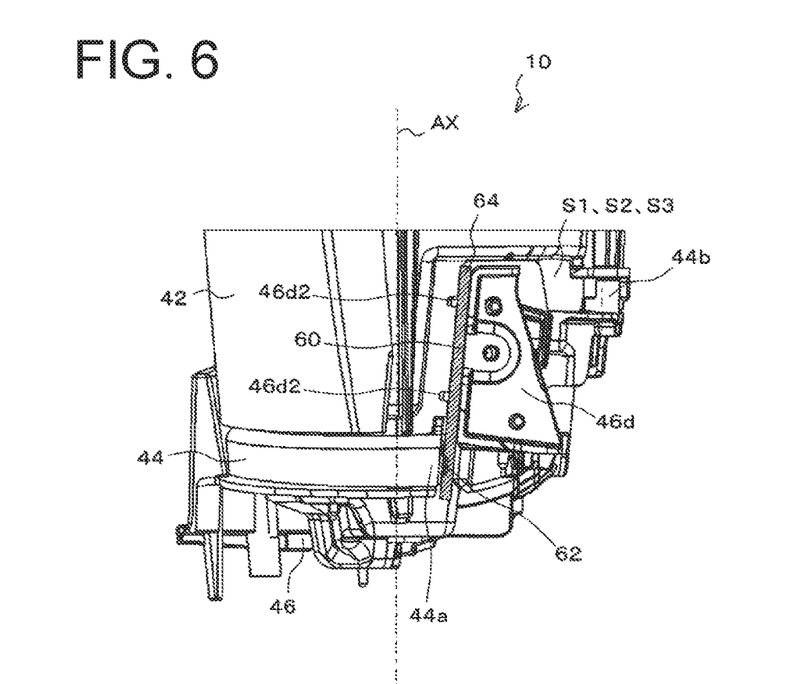
FIG. 6 is a partial top plan view of the vehicle lighting fixture 10.

As illustrated in FIG. 6, when the pin 46d2 of the light source module holding portion 46d is inserted into, and fit to, the through hole 64a of the substrate 64, the light source module 60 can be fixed to the light source module holding portion 46d at the light source module attachment surface 46d1.

The sub-bracket 46 configured as described above can be disposed such that the screw receiving portions 32d of the turn signal reflector 32 can be inserted into the through holes 46e1 for fixing a housing of the sub-bracket 46 (see FIG. 4), that the light source module 60 together with the light source module holding portion 46d can be disposed in a space formed (defined) by the cutout portion S1 of the tubular bracket 20, the cutout portion S2 of the sleeve lens 42, and the cutout portion S3 of the light guide body 44, and that the base end portion 44a of the light guide body 44 can face to the light source 62 for a rear lamp.

Then, a not-illustrated fixing screw (for temporary assembly) inserted into the through hole 46e2 for temporary assembly of the sub-bracket 46 can be screwed into the screw receiving portion 32e for temporary assembly of the turn signal lamp reflector 32 of the first lamp unit 30, which has been inserted into the through hole 22b for temporary assembly of the tubular bracket 20 and also into the through hole 42c2 for temporary assembly of the sleeve lens 42.

In this manner, the sub-bracket 46 can hold the first lamp unit 30 and the second lamp unit 40 (specifically, the tubular bracket 20, the sleeve lens 42, and the light guide body 44) so that they are interposed between the sub-bracket 46 and the turn signal lamp reflector 32 (see FIGS. 3A and 3B). Thus, the first lamp unit 30 can be supported by and fixed to the tubular bracket 20 while the first lamp unit 30 can be disposed in the space surrounded by the inner peripheral surface of the tubular bracket 20. Furthermore, the second lamp unit 40 can be supported by and fixed to the tubular bracket 20 while the second lamp unit 40 can be disposed along the outer peripheral surface of the tubular bracket 20. In this case, the turn signal lamp reflector 32 can be supported by and fixed to the tubular bracket 20 while at least part of the outer peripheral surface of the turn signal lamp reflector 32 can be in contact (surface contact, for example) with the inner peripheral surface of the tubular bracket 20. Further, the sleeve lens 42 can be supported by and fixed to the tubular bracket 20 while at least part of the inner peripheral surface of the sleeve lens 42 can be in contact (surface contact, for example) with the outer peripheral surface of the tubular bracket 20.

Furthermore, the sub-bracket 46 can be provided with ribs 46f so as to be in contact with the sleeve lens 42 (see FIG. 3A). Consequently, this structure can reduce the gap between the sleeve lens 42 and the sub-bracket 46.

The above-described sub-bracket 46 can be molded by injection molding a synthetic resin, such as an acrylic resin or a polycarbonate resin, using a metal mold.

In the second lamp unit 40 configured as described above, the light emitted from the light source module 60, i.e., from the light source 62 for a rear lamp, can be incident on the base end portion 44a of the light guide body 44 and guided through the curved portion 44c thereof. During the guiding of the light, the light can be internally reflected by the diffusion surface 44e of the light guide body 44 to uniformly (or substantially uniformly) exit through the entire (or substantially entire) light emission surface 44d of the light guide body 44, and then can enter the sleeve lens 42 through the rear opening end surface 42b, which faces to the light emission surface 44d of the light guide body 44. Then, the light can be projected uniformly (or substantially uniformly) forward through the entire (or substantially entire) front opening end surface 42a of the sleeve lens 42.

Figure 8:
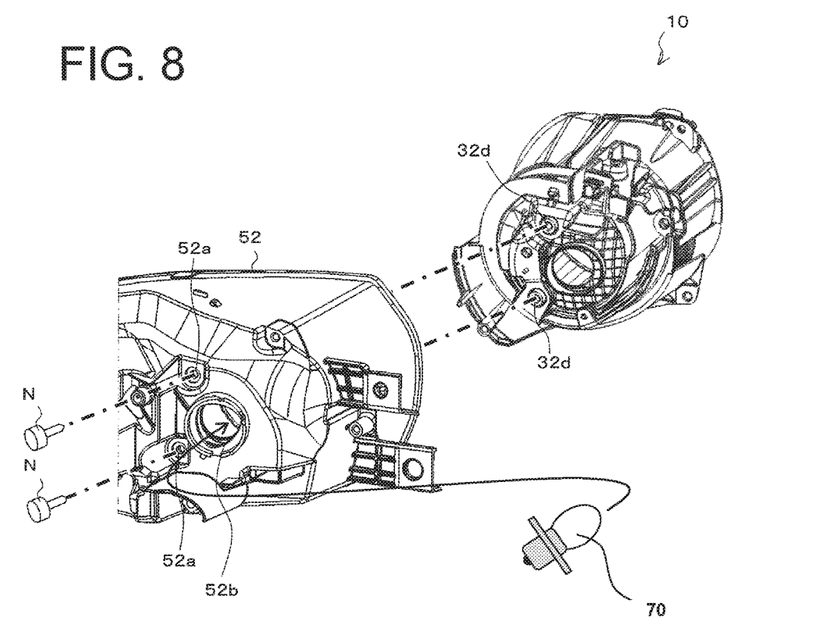
FIG. 8 is a partially exploded perspective view illustrating the relationship between the vehicle lighting fixture 10 and a housing 52.

The aforementioned components of the vehicle lighting fixture 10 can be fixed to the housing 52 in the following manner. That is, the housing 52 can have a through hole 52a formed as illustrated in FIGS. 4 and 8, and a fixing screw N can be inserted into the through hole 52a. Then, the inserted fixing screw N can be screwed into the screw receiving portion 32d for fixing a housing of the first lamp unit 30 (part of the turn signal lamp reflector 32), which has been inserted into the through hole 22a for fixing a housing of the tubular bracket 20, the through hole 42c1 for fixing a housing of the sleeve lens 42, and the through hole 46e1 for fixing a housing of the sub-bracket 46. Herein, the through hole 52a formed in the housing 52 corresponds to the third through hole of the presently disclosed subject matter.

Furthermore, the housing 52 can be provided with ribs 52c (two in the illustrated example of FIG. 3A) so as to be in contact with the sub-bracket 46. Consequently, the components of the vehicle lighting fixture 10 can be fixed to the housing 52 with stable attitude.

As described above, there can be provided the vehicle lighting fixture 10 allowing a plurality of lamp units (constituent elements), i.e., the first lamp unit 30 and the second lamp unit 40 to be attached to the housing 52 effectively (providing an improved operation efficiency).

This can be achieved by unitizing the first lamp unit 30 and the second lamp unit 40 by means of the tubular support body 20 as a single unit.

Furthermore, according to this exemplary embodiment, the provided vehicle lighting fixture 10 can be miniaturized even with the plurality of lamp units, i.e., the first lamp unit 30 and the second lamp unit 40.

This can be achieved by the specific arrangement in which the first lamp unit 30 is disposed in the inner space surrounded by the inner peripheral surface of the tubular bracket 20 while the second lamp unit 40 is disposed along the outer peripheral surface of the tubular bracket 20.

According to this exemplary embodiment, only by screwing the fixing screw N having been inserted into the through hole 52a formed in the housing 52 into the part of the first lamp unit 30 (the part of the turn signal lamp reflector 32), the first lamp unit 30 and the second lamp unit 40 (constituent elements of the respective lamp units 30 and 40) of the vehicle lighting fixture 10 can be attached to the housing 52 with ease.

Further, according to this exemplary embodiment, the first lamp unit 30 and the second lamp unit 40 can be supported by and fixed to the common tubular bracket 20. Thus, even if each of the lamp units itself does not have a structural strength enough to stand itself, the lamp units with various structures can be configured.

Furthermore, according to this exemplary embodiment, the light (amber light) from the light source 70 for a turn signal lamp and the light (red light) from the light source 62 for a rear lamp can be prevented from being mixed with each other, so that the separate colored light beams can be projected. This means that the intrinsic functions of the respective lamp units 30 and 40 can be prevented from being impaired.

This can be achieved by optically shielding the first lamp unit 30 (including the light source 70 for a turn signal lamp) and the second lamp unit (including the light source 62 for a rear lamp) from each other by the light-shielding tubular bracket 20.

A description will now be given of a modified example.

The above-described exemplary embodiment has adopted a cylindrical bracket as the tubular bracket 20, however, it is not limitative. For example, the tubular bracket 20 may be an elliptical cylindrical bracket, a polygonal cylindrical bracket, or any other type cylindrical bracket.

In the above-described exemplary embodiment, the first lamp unit 30 can function as the turn signal lamp unit and the second lamp unit 40 can function as the rear lamp unit. However, the presently disclosed subject matter is not limited thereto. For example, the first lamp unit 30 may function as a rear lamp unit and the second lamp unit 40 may function as a turn signal lamp unit. Furthermore, the first lamp unit 30 may function as a turn signal lamp unit and the second lamp unit 40 may function as another functional lamp unit other than a turn signal lamp unit, for example, a stop lamp unit. In addition, the second lamp unit 40 may function as a rear lamp unit and the first lamp unit 30 may function as another functional lamp unit other than a turn signal lamp unit, for example, a rear lamp unit. Furthermore, the first lamp unit 30 may function as a headlamp unit and the second lamp unit 40 may function as a DRL lamp unit.

In the above-described exemplary embodiment, the first lamp unit 30 is described as a reflector-type lamp unit including the turn signal lamp reflector 32. However, the presently disclosed subject matter is not limited thereto. For example, the first lamp unit 30 may be a projector-type lamp unit, a direct-projection type lamp unit, or any type of lamp unit.

In the above-described exemplary embodiment, the second lamp unit 40 is described as a lamp unit including the sleeve lens 42 and the light guide body 44. However, the presently disclosed subject matter is not limited thereto. For example, the second lamp unit 40 may be another type lamp unit configured to include the same light emission region as the light emission region A2.

In the above-described exemplary embodiment, the light source 70 for a turn signal lamp is described as a bulb light source. However, the presently disclosed subject matter is not limited thereto and may use a semiconductor light emitting element, such as an LED.

In the above-described exemplary embodiment, the light source 62 for a rear lamp is described as a semiconductor light emitting element, such as an LED. However, the presently disclosed subject matter is not limited thereto and may use a bulb light source other than the semiconductor light emitting element.

In the above-described exemplary embodiment, the light source 70 for a turn signal lamp is described to be attached to the attachment hole 52b formed in the housing 52. However, the presently disclosed subject matter is not limited thereto. For example, when a semiconductor light emitting element, such as an LED is used as the light source for a turn signal lamp, the light source for a turn signal lamp may be attached to the sub-bracket 46 and the like, or may be directly attached to the turn signal lamp reflector 32.

In the above-described exemplary embodiment, the light-shielding property can be imparted to the tubular bracket 20 by injection molding a light-shielding synthetic resin. However, the presently disclosed subject matter is not limited thereto. For example, a tubular bracket injection molded with a non-light shielding synthetic resin may be coated with a light-shielding paint or covered with a light-shielding film to impart the light-shielding property to the tubular bracket that serves as the tubular bracket 20. In another aspect, a tubular bracket may be formed from a metal to impart the light-shielding property to the tubular bracket that serves as the tubular bracket 20.

The various numerical values shown in the above-described exemplary embodiments are for illustrative purposes, and not limitative. Obviously, the presently disclosed subject matter can adopt various different appropriate numerical values.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting fixture comprising:
   a tubular support body having a front opening and a rear opening opposite to the front opening, and an inner peripheral surface defining an inner space and an outer peripheral surface;
   a first lamp unit including a reflector configured to reflect light from a first light source to direct the light toward a front side, and a lens disposed in front of the reflector and configured to allow the light reflected from the reflector to pass therethrough, the first lamp unit being configured to be supported by the tubular support body in a state where the first lamp unit is arranged in the inner space surrounded by the inner peripheral surface of the tubular support body, the first lamp unit being configured to emit light from the first light source toward the front side; and
   a second lamp unit including a second light source, a light guiding member configured to guide the light from the second light source, a sub-bracket configured to hold the second light source, and a tubular lens body having an incident surface, on which the light from the second light source having been guided by the light guiding member is incident, and a light emission surface through which the light having entered the lens body exits, the second lamp unit being configured to be supported by the tubular support body in a state so that the second lamp unit is arranged along the outer peripheral surface of the tubular support body, the second lamp unit being configured to emit light from the second light source to the front side, and the tubular lens body being supported by the tubular support body such that an inner peripheral surface of the tubular lens body faces to the outer peripheral surface of the tubular support body, wherein
   the reflector of the first lamp unit is a separate member disposed in an inner space surrounded by the inner peripheral surface of the tubular support body.

2. The vehicle lighting fixture according to claim 1, wherein
   the light emitted from the first light source has a hue different from that of the light emitted from the second light source, and
   the tubular support body has a light-shielding property.

3. The vehicle lighting fixture according to claim 2, comprising a housing and an outer lens configured to form a lighting chamber together with the housing, and wherein
   the tubular support body, the first lamp unit, and the second lamp unit are disposed in the lighting chamber,
   the tubular support body includes a wall part configured to cover a part of the rear opening,
   the wall part has a first through hole into which a part of the first lamp unit is inserted,
   the second lamp unit has a second through hole into which the part of the first lamp unit having been inserted into the first through hole is inserted,
   the housing has a third through hole into which a fixing screw is inserted,
   the fixing screw having been inserted into the third through hole of the housing is screwed to the part of the first lamp unit having been inserted into the first through hole of the wall part of the tubular support body and also into the second through hole of the second lamp unit, so that the tubular support body, the first lamp unit, and the second lamp unit are fixed to the housing.

4. The vehicle lighting fixture according to claim 3, wherein the first light source is mounted to the housing.

5. The vehicle lighting fixture according to claim 2, wherein the tubular support body is a cylindrical support body.

6. The vehicle lighting fixture according to claim 1, comprising a housing and an outer lens configured to form a lighting chamber together with the housing, and wherein
   the tubular support body, the first lamp unit, and the second lamp unit are disposed in the lighting chamber,
   the tubular support body includes a wall part configured to cover a part of the rear opening,
   the wall part has a first through hole into which a part of the first lamp unit is inserted,
   the second lamp unit has a second through hole into which the part of the first lamp unit having been inserted into the first through hole is inserted,
   the housing has a third through hole into which a fixing screw is inserted,
   the fixing screw having been inserted into the third through hole of the housing is screwed to the part of the first lamp unit having been inserted into the first through hole of the wall part of the tubular support body and also into the second through hole of the second lamp unit, so that the tubular support body, the first lamp unit, and the second lamp unit are fixed to the housing.

7. The vehicle lighting fixture according to claim 6, wherein the first light source is mounted to the housing.

8. The vehicle lighting fixture according to claim 1, wherein the tubular support body is a cylindrical support body.

9. The vehicle lighting fixture according to claim 1, wherein the tubular support body has a light-shielding property that optically isolates the first lamp unit and the second lamp unit so as to prevent respective functions of the first lamp unit and the second lamp unit from being impaired.

10. The vehicle lighting fixture according to claim 1, wherein
the first lamp unit has an outer peripheral surface formed in a substantially similar shape to the inner peripheral surface of the tubular support body, and is provided with a rib formed on the outer peripheral surface thereof so as to be in contact with the inner peripheral surface of the tubular support body to reduce a gap between the first lamp unit and the tubular support body.

11. The vehicle lighting fixture according to claim 10, wherein
the second lamp unit has an inner peripheral surface formed in a substantially similar shape to the outer peripheral surface of the tubular support body, and is provided with a rib formed on the inner peripheral surface thereof so as to be in contact with the outer peripheral surface of the tubular support body to reduce a gap between the second lamp unit and the tubular support body.

12. The vehicle lighting fixture according to claim 1, wherein
the second lamp unit has an inner peripheral surface formed in a substantially similar shape to the outer peripheral surface of the tubular support body, and is provided with a rib formed on the inner peripheral surface thereof so as to be in contact with the outer peripheral surface of the tubular support body to reduce a gap between the second lamp unit and the tubular support body.

13. The vehicle lighting fixture according to claim 1, wherein
the first lamp unit has an outer peripheral surface formed in a substantially similar shape to the inner peripheral surface of the tubular support body, and is at least partly in contact with the inner peripheral surface of the tubular support body to reduce a gap between the first lamp unit and the tubular support body, and
the second lamp unit has an inner peripheral surface formed in a substantially similar shape to the outer peripheral surface of the tubular support body, and is at least partly in contact with the outer peripheral surface of the tubular support body to reduce a gap between the second lamp unit and the tubular support body.

14. The vehicle lighting fixture according to claim 1, wherein
the sub-bracket of the second lamp unit and the reflector of the first lamp unit hold the tubular support body so that first lamp unit is supported by and fixed to the tubular support body in the inner space surrounded by the inner peripheral surface of the tubular support body and the second lamp unit is supported by and fixed to the tubular support body while the second lamp unit is disposed along the outer peripheral surface of the tubular support body.

15. The vehicle lighting fixture according to claim 14, wherein
the first lamp unit has an outer peripheral surface formed in a substantially similar shape to the inner peripheral surface of the tubular support body, and is provided with a rib formed on the outer peripheral surface thereof so as to be in contact with the inner peripheral surface of the tubular support body to reduce a gap between the first lamp unit and the tubular support body.

16. The vehicle lighting fixture according to claim 15, wherein
the second lamp unit has an inner peripheral surface formed in a substantially similar shape to the outer peripheral surface of the tubular support body, and is provided with a rib formed on the inner peripheral surface thereof so as to be in contact with the outer peripheral surface of the tubular support body to reduce a gap between the second lamp unit and the tubular support body.

17. The vehicle lighting fixture according to claim 14, wherein
the second lamp unit has an inner peripheral surface formed in a substantially similar shape to the outer peripheral surface of the tubular support body, and is provided with a rib formed on the inner peripheral surface thereof so as to be in contact with the outer peripheral surface of the tubular support body to reduce a gap between the second lamp unit and the tubular support body.

18. The vehicle lighting fixture according to claim 14, wherein
the sub-bracket has an inner peripheral surface provided with a rib formed thereon so as to be in contact with an outer peripheral surface of the tubular lens body to reduce a gap between the sub-bracket and the tubular lens body.

* * * * *